(No Model.)
G. P. NORTON.
Meat Choppers.
No. 231,187. Patented Aug. 17, 1880.
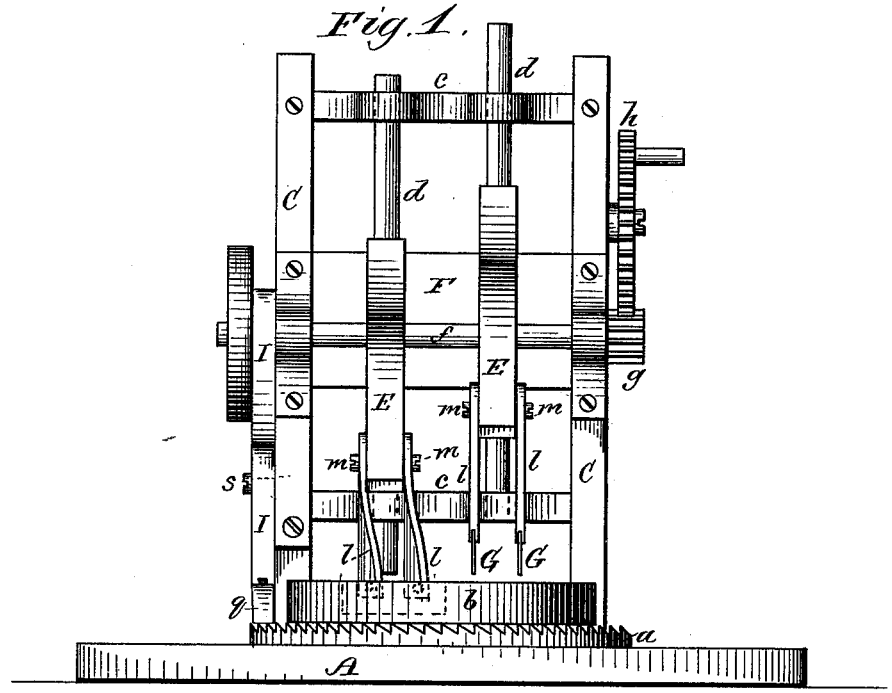
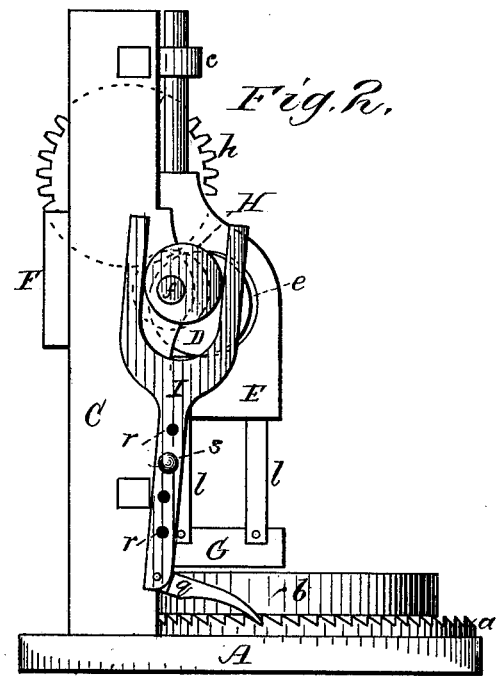
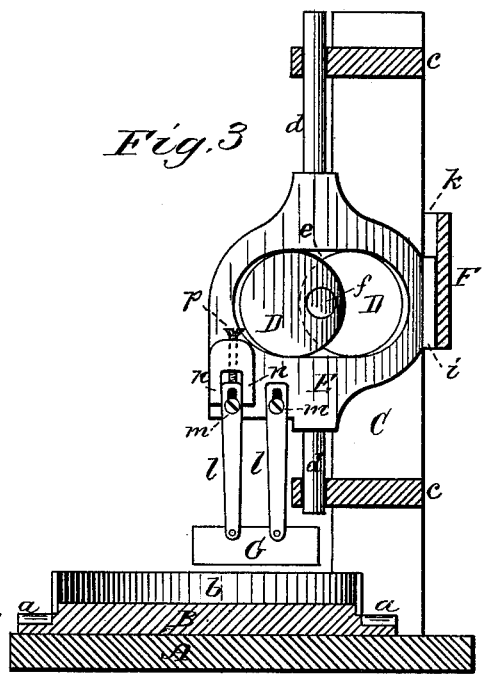
Witnesses
Nat. E. Oliphant,
Geo. R. Porter
Inventor
George P. Norton,
per Chas. H. Fowler
Attorney.

UNITED STATES PATENT OFFICE.

GEORGE P. NORTON, OF SOMERVILLE, ASSIGNOR TO ABRAHAM T. HUFF, OF NESHANIC, NEW JERSEY.

MEAT-CHOPPER.

SPECIFICATION forming part of Letters Patent No. 231,187, dated August 17, 1880.

Application filed April 23, 1880. (No model.)

*To all whom it may concern:*

Be it known that I, GEORGE P. NORTON, a citizen of the United States, residing at Somerville, in the county of Somerset and State of New Jersey, have invented certain new and useful Improvements in Meat-Choppers; and I do hereby declare that the following is a full, clear, and exact description of the same, reference being had to the annexed drawings, making a part of this specification, and to the letters and figures of reference marked thereon.

Figure 1 of the drawings is a front elevation of my invention; Fig. 2, a side elevation of the same; and Fig. 3, a side elevation, partly in section.

The present invention has relation to that class of meat and vegetable choppers in which are employed vertically-reciprocating knives and a horizontally-rotating chopping-block having its motion imparted to it by a suitable mechanism, whereby the velocity of rotation is governed independently of the motion of the knives.

The invention consists in certain novel means employed to impart to the knives a vertically-reciprocating motion and the independent rotary motion of the chopping-block, as illustrated in the drawings and hereinafter described.

In the accompanying drawings, A represents the platform or base, to which is connected, in any suitable manner, the chopping-block B, having the usual ratchet-teeth $a$ and hoop or band $b$. The frame of the machine, which is connected to the platform or base A, consists of the uprights C and cross-pieces $c$, through which pass the ends of the shafts $d$, to hold them and guide them in their vertical motion. These shafts are enlarged at a point between the cross-pieces $c$, and have horizontally-elongated openings $e$, to receive the eccentrics D upon a horizontal shaft, $f$, said shaft having its bearings in the uprights C. The shaft $f$, at one of its ends, has a gear-wheel, $g$, meshing with the teeth upon a large driving-wheel, $h$, operated by any suitable power. The shafts $d$, or that portion of them represented by the blocks E, are formed with vertical guides $i$, fitting into corresponding grooves $k$ in a board, F, to guide the blocks E and steady them so that they will not move laterally, and thereby insure their being properly acted upon by the eccentrics D to impart to the shafts $d$ the required vertically-reciprocating motion.

The knives G have shanks $l$, with elongated slots in their upper ends, by which they are adjustably connected to the blocks E by screws $m$.

If desired, the blocks may be formed with lugs or shoulders $n$, to form a seat for the end of the shanks $l$, to prevent them from working out of a vertical line or from lateral displacement; also, set-screws $p$ may be employed to prevent the shanks from being pressed or working up from the position in which they are set, as illustrated in Fig. 3.

The shaft $f$ has at one end an eccentric, H, working in the forked end of a lever, I, said lever being pivoted to the side of one of the uprights C, and has a vibratory motion imparted to it by the eccentric H. To the lower end of the lever I is pivoted a pawl, $q$, which engages with the ratchet-teeth $a$ upon the chopping-block B. The stride or push of the pawl $q$ into the serrations increases or diminishes the rapidity of the block B in its rotation in proportion to the vibrations of the lower end of the lever I. This motion of the lever is regulated by changing its pivotal center or fulcrum. To accomplish this I have formed the lever with a series of holes, $r$, to correspond with a like number in the side of the upright C, so that by removing the fulcrum-pin $s$ and placing it in any one of the series of holes $r$ the pivotal or fulcrum point of the lever I may be raised or lowered, which will increase or diminish the stride or push of the pawl $q$ by the corresponding degree of vibratory sweep of the lower end of the lever.

By this arrangement a very simple and effective means is employed for operating the rotary chopping-block B, and also the chopping-knives G, and not only producing a meat-chopper simple in construction and less complicated, but possessing great strength and not easily injured by the great strain which is customary upon this class of machines, in consequence of the great power required to operate them.

The eccentrics D D are so arranged upon the shaft $f$ with relation to each other that the knives are never engaging with the meat nearest the surface of the chopping-block while it is being moved by the pawl $q$, thereby avoiding the scraping of the cutting-edges of the knives on the block and the pressing of the meat against the forward side of the knife.

Having now fully described my invention, what I claim as new, and desire to secure by Letters Patent, is—

1. In a meat or vegetable chopper, the combination, with the chopping-block B, having ratchet-teeth $a$, of the pivoted lever I, forked at its upper end and operated by the eccentric H, said lever carrying pivoted pawl $q$, and having the holes $r$ and removable pin $s$, substantially as and for the purpose set forth.

2. In a meat or vegetable chopper, the shafts $d$, having blocks E, with elongated openings $e$, and adjustable knives G and guides $i$, the shaft $f$, eccentrics D, and the board F, with groove $k$, substantially as and for the purpose specified.

In testimony that I claim the above I have hereunto subscribed my name in the presence of two witnesses.

GEORGE P. NORTON.

Witnesses:
JAMES GASTON,
HENRY VAN DOREN.